Sept. 29, 1959

S. I. ROCHWITE 2,906,183

STEREOSCOPIC CAMERA

Filed Sept. 22, 1954

INVENTOR.
Seton I. Rochwite
BY
Emery J. Wutschel
Attorney

Sept. 29, 1959  S. I. ROCHWITE  2,906,183
STEREOSCOPIC CAMERA
Filed Sept. 22, 1954  3 Sheets-Sheet 2

INVENTOR.
Seton I. Rochwite
BY
Elroy J. Wutschel
Attorney

United States Patent Office 2,906,183
Patented Sept. 29, 1959

2,906,183

STEREOSCOPIC CAMERA

Seton I. Rochwite, Boulder, Colo.

Application September 22, 1954, Serial No. 457,619

9 Claims. (Cl. 95—18)

This invention relates generally to stereoscopic cameras and more particularly to an improved film feeding and panoramic indexing apparatus for a camera of the so called stereo type.

Prior stereo cameras have been provided in customary manner with spaced apart twin lenses for simultaneously taking two pictures of the same subject. The two images of the same subject were then adapted to be simultaneously viewed, by suitable well known means, in such a manner as to produce a third dimensional effect of a single image of the selected subject. In order to take successive stereo views, these cameras are provided with a film feeding mechanism adapted to successively index spaced apart portions of a sensitized film strip in position relative to the twin lenses. Consequently, the sensitized film strip was successively indexed relative to the spaced-apart twin lenses in some kind of a predetermined regular pattern.

Prior types of stereo film feeding mechanisms, however, produce an intermixed sequence of successive stereo pairs that precludes the most effective use of such a camera for taking panoramic stereo views. In prior stereo cameras, for example, a sequence of stereo pairs intended to produce a panoramic sequence (view) would require the cutting and separation of each picture comprising a part of each stereo pair. The pictures comprising the several pairs would then have to be rearranged and mounted in a manner to constitute two continuous mosaic strips, one for the right eye and the other for the left eye. Since the two strips would be formed by placing separate, pictures in adjacent relationship, some form of masking would undoubtedly be required between each of the adjacent pictures or frames. Such a masking arrangement would reduce the size of each frame and interrupt the continuity of the panoramic sequence. It will be apparent that such an arrangement for obtaining a panoramic sequence would involve complicated mounting procedures and be extremely expensive to accomplish.

A general object of this invention is to provide an improved stereo camera, particularly adapted for taking panoramic stereoscopic views.

Another object of this invention is to provide an improved film feeding mechanism for a stereo camera.

Another object of this invention is to provide an improved film feeding mechanism for a stereo camera that is particularly appropriate for taking panoramic stereoscopic views.

Another object of the invention is to provide in a stereo camera an improved film feeding mechanism adapted to advance film in an improved manner, making it possible to cut a plurality of adjacent frames respectively taken by the spaced apart lenses to constitute two individual continuous strips.

Another object of the invention is to provide an improved stereo camera that is equally well suited for taking conventional stereo pairs as well as for taking panoramic stereoscopic views.

Another object of the invention is to provide an improved timing and indexing mechanism in the film feeding mechanism for a stereo camera.

Another object is to provide a panoramic indexing device for a stereo camera in combination with indicating means in the camera for correlating a series of stereo pairs comprising a panoramic sequence with the corresponding selected positions of said panoramic indexing device.

A further object of the invention is to provide a stereo camera having a pair of coordinately operable indicating devices, one being arranged to register the number of exposures that remain on the film, and the other being adapted to register a particular exposure constituting one exposure of a panoramic sequence.

A further object of the invention is to provide a stereo camera incorporating a coordinately operative exposure indicator and a panoramic sequence indicator.

A still further object is to incorporate an improved unitary control mechanism in a stereo camera that is coordinately operative to effect feeding advancement of the film, to cock the shutter mechanism, to actuate an exposure indicator and to actuate a panoramic sequence indicator.

According to this invention, a stereo camera is provided with an improved film feeding mechanism connected to be actuated by a single, centrally located, rotatable control knob. The single control knob is connected to actuate a gear train for advancing successively adjacent spaced apart portions of a sensitized film strip relative to the spaced apart lenses of the camera. To limit the movement of the control knob for properly positioning the film strip, there is provided a coordinately operable indexing device and timing cam mechanism which is operative to control the repetitive cycles of operation. The timing cam is arranged to control the indexable advancement of the film strip in a manner to provide a greatly improved spaced relationship between successive pairs of pictures. The improved spaced relationship between the successive stereo pairs renders the camera particularly adaptable for taking a panoramic sequence of stereo pictures. To register the actual number of unexposed frames on the film, there is provided an exposure indicator dial that is connected to be advanced by the control knob in coordinated relationship with a panoramic sequence indicator dial. To indicate the particular number of a sequence of panoramic stereo views, the panoramic sequence indicator dial is provided with calibrations in an identical manner to like calibrations carried by a panoramic indexing device adapted to rotatably support the camera for bodily indexable movement.

To facilitate the taking of a panoramic stereo view, the improved film feeding mechanism is so operative that a plurality of successively adjacent, spaced apart portions of a sensitized film strip are sequentially indexed into position relative to the spaced apart twin lenses of a stereo camera. Thus during one cycle of operation, three successively adjacent exposures of the film strip are taken by one lens in coordinated timed relationship with three successive adjacent exposures by the other lens, with no unexposed portion of the film strip remaining between the respective groups of three pictures. The cycles of operation, i.e. sequential advancement of three adjacent stereo pairs, are repeated until the film strip is completely exposed. After developing, it is possible to cut three successively adjacent pictures, taken by one lens, to constitute one continuous picture. In like manner, it is possible to cut the matching three adjacent pictures, taken by the other lens, as one continuous picture. The two groups of three pictures, taken by the separate lenses, are then in stereoscopic correspondence with each other and can be viewed in a manner similar to a single pair of matching stereo pictures or transparencies.

The foregoing and other objects of the invention which will become more fully apparent from the following detailed specification, may be achieved by the particular stereo camera described herein by way of example as illustrating preferred embodying structure of the invention in connection with the accompanying drawings, in which.

Figure 1:
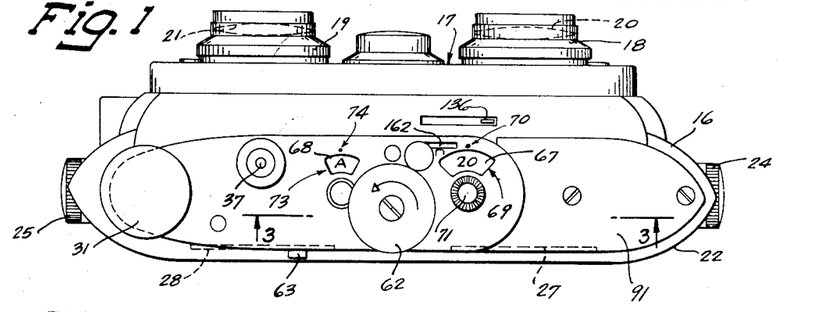
Figure 1 is a top plan view of a stereo camera incorporating the invention.
Figure 2:
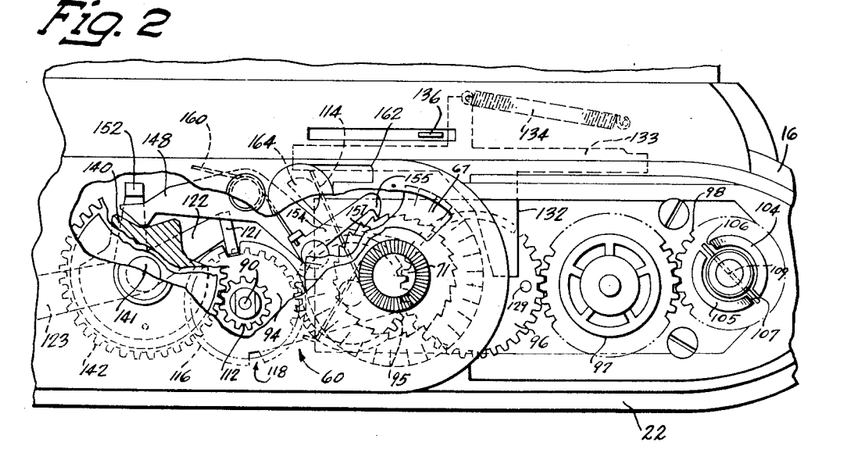
Fig. 2 is an enlarged fragmentary view, partly in top plan and partly in transverse horizontal section showing the internal operating mechanism.

Referring more specifically to the drawings and particularly to Figs. 1 and 2 thereof, the stereo camera there shown comprises essentially a hollow housing 16, having secured to its front face 17 a pair of spaced apart lens mounts 18 and 19 of identical size. The lens mounts 18 and 19 are respectively disposed to carry matched lenses 20 and 21 that are of identical matched focal lengths, in well known manner. The lens mounts 18 and 19 likewise are mechanically interconnected for simultaneous operation to effect a coordinated and simultaneous adjustment of the focal lengths of the respective lenses 20 and 21 carried thereby. Each of the lens mounts with their associated lenses, is disposed to open into separate hollow light proof enclosures contained within the hollow camera frame 16. The separate light proof enclosures (not shown) respectively associated with the lens mounts 18 and 19 are delimited at their rearward inner ends by a back cover 22 removably secured to the hollow housing 16 by a pair of rotatably knurled locking knobs 24 and 25. The back cover 22 is removable from the housing 16 for convenience in loading the camera with a roll of film in customary well known manner. The inner face of the back cover 22 is provided with a pair of spaced apart, resiliently biased pressure plates 27 and 28 arranged to constitute a resiliently biased guideway for a sensitized film strip, such as the thirty-five millimeter film 30 shown by way of example in Figs. 3 and 5.

The sensitized film strip 30 constitutes a portion of the film contained within the usual light proof cartridge (not shown) that is removably carried within a tubular recess formed within the leftward portion of the housing 16. A rewind knob 31 journalled in the upper leftward wall of the housing 16 is provided with a forked inner end that is removably engageable with a spool carried in the film cartridge. With a film cartridge inserted within the leftward end of the housing 16 and the rightward end of the film strip 30 threaded through a slotted take-up spool 33 journalled within the rightward portion of the housing 16, the camera is ready for operation. The rightward or take-up spool 33 journalled in the housing 16, together with another shaft 34 journalled within the central rearward portion of the hollow housing 16, and between the light proof enclosures, constitutes a portion of an improved film feeding or transport mechanism. The intermediate shaft 34 is provided toward its opposite ends with sprocket wheels 35 and 36 respectively disposed to engage perforations provided at the opposite sides of the film strip 30.

Assuming now that the camera has been loaded in the usual manner and readied for taking a picture, then the film strip 30 will be stretched tightly between the cartridge, associated with the rewind knob 31, and the take-up spool 33. The arrangement is such that spaced apart portions or frames of the film strip, such as the frames identified as $A_{R1}$ and $A_{L1}$ in Fig. 5, will be respectively retained by the pressure plates 27 and 28 associated with the back cover 22 in bridging engagement with the enclosures or film gates associated with the lens 20 carried by the rightward lens mount 18 and the lens 21 carried by the leftward lens mount 19. For taking a picture, there is provided the usual shutter mechanism (not shown) comprising simultaneously operable shutters respectively associated with and located rearwardly of the lens mounts 18 and 19. A shutter release button 37 is connected to actuate the shutter mechanism in a manner to simultaneously expose the frames $A_{R1}$ and $A_{L1}$ of the film strip 30, Fig. 5. To focus the camera for taking a selected picture, there is provided an eye level viewer 40, Fig. 7, that is operative in well known manner.

After the film 30 is developed, the spaced apart frames $A_{R1}$ and $A_{L1}$, constituting one single matching stereo pair of transparencies, are then mounted in well known manner in spaced apart relationship in a single slide mount (not shown) for stereo viewing. The slide mount with the single pair of spaced apart transparencies may then be placed in a stereo viewer of conventional type that is provided with right and left eye pieces. A person looking through the eye pieces at the two transparencies receives a distinct impression of depth in what then appears as a single transparency. As is well known in the art, the merging or superimposing of the two transparencies is accomplished by the two eyes and the mind of the person viewing the slide.

Figure 8:
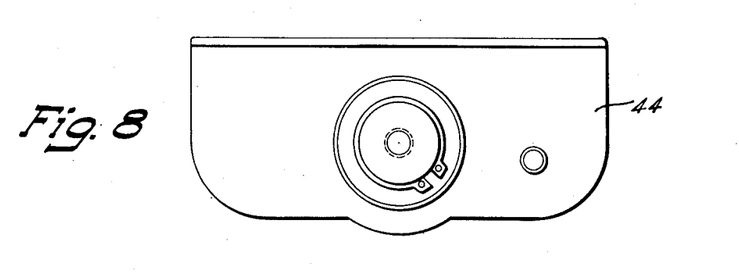
Fig. 8 is a plan view of the panoramic indexing device.
Figure 9:
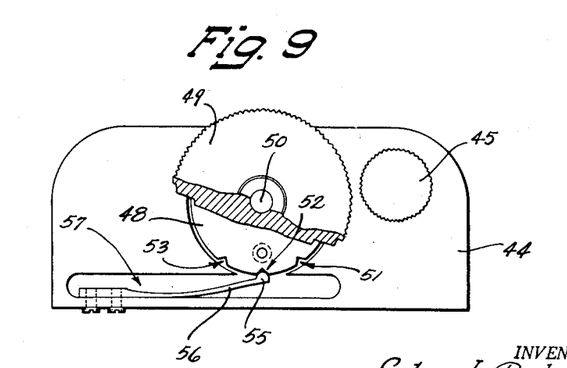
Fig. 9 is another view in horizontal section through the panoramic indexing device taken generally along the lines 9—9 in Fig. 7.

The stereo camera illustrated in the drawings as constituting a preferred embodiment of the invention, may be utilized, as hereinbefore described, for taking a conventional single matching pair of stereo transparencies. In addition to this, however, the stereo camera exemplifying the invention is especially adapted for taking a sequence of stereo pairs constituting a single stereo panoramic view. To this end, the operating mechanism within the camera is arranged to be operated in correlated relationship with a panoramic indexing device shown in Figs. 7, 8 and 9. In taking a panoramic sequence of pictures, it is necessary that the entire camera be bodily indexed to a plurality of successive stations and a separate picture (stereo pair) be taken at each station of indexed position. Because of the inherent characteristic of a stereo camera, i.e., taking two pictures of the same subject simultaneously, it is necessary to predeterminately position the film strip before starting a panoramic sequence. For this purpose, as will hereinafter be more fully explained, the camera is provided with a panoramic sequence indicator having registrations adapted to be read in conjunction with corresponding registrations on the indexing device.

Figure 7:
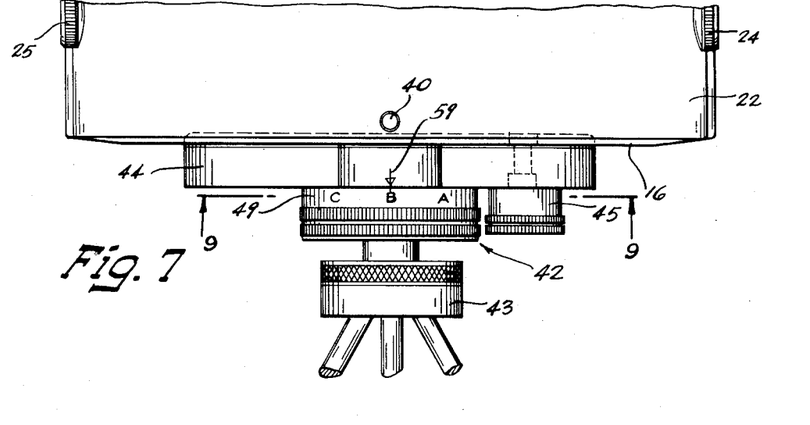
Fig. 7 is an enlarged fragmentary view in rear elevation of the panoramic indexing device interposed between a tripod and the panoramic stereo camera.

As shown in Fig. 7, the housing 16 of the camera is mounted for indexable movement upon the panoramic indexing device 42 that is, in turn, removably secured to the upper end of a tripod 43. The indexing device 42 comprises a support bracket 44 removably secured to the underside of the camera housing 16 by means of a knurled clamp screw 45 threadedly engaging the housing 16. The support bracket 44 is rotatably journalled upon a circular bearing plate 48 that is fixedly secured within a hollow circular housing 49 having an upstanding flanged wall. The underside of the housing 49 is provided with a threaded aperture 50 adapted to receive a threaded male fitting, such as provided on the tripod 43.

With the support bracket 44 secured to the frame 16, as shown in Fig. 7, the camera is journalled for rotation about a pivot axis lying in the same vertical plane as the diaphragms (not shown) respectively associated with the lens mounts 18 and 19, Fig. 1, and spaced midway there between. To position the camera in a selected indexed position, the bearing plate 48 is provided on its periphery with three radially extending indexing notches 51, 52 and 53. One or another of the indexing notches 51, 52 and 53 is respectively disposed to be engaged by a detent 55 carried at one end of a resilient arm 56. The resilient arm 56 is disposed within a longitudinally extending recess 57 formed within the support bracket 44, and is secured thereto at its opposite end. By means of this arrangement, the camera housing 16, together with the spaced apart lens mounts 18 and 19, Fig. 1, can be indexed to one of three distinct detent engaged positions about the pivot axis.

To determine the selected position of the camera about the pivot axis, as shown in Fig. 7, a zero mark 59 scribed on the edge of the support bracket 44 is adapted to be read against three indicia A, B, and C etched on the adjacent outer flanged wall of the circular housing 49. The arrangement is such that in taking a plurality of panoramic stereo pairs, the tripod 43 is first positioned to direct the twin lens mounts 18 and 19 in the general direction of the subject to be photographed. After suitably leveling the support bracket 44, the camera is indexed to the first position with the zero mark being read against the letter A, and the shutter release button 37 is depressed to take the first stereo pair. The camera is then indexed to the B position, and the second stereo pair is exposed. This procedure is then repeated, with the camera indexed to the C position, to provide a continuous series of three stereo film pairs that are adapted, when developed, to provide a panoramic stereoscopic effect.

Figure 3:
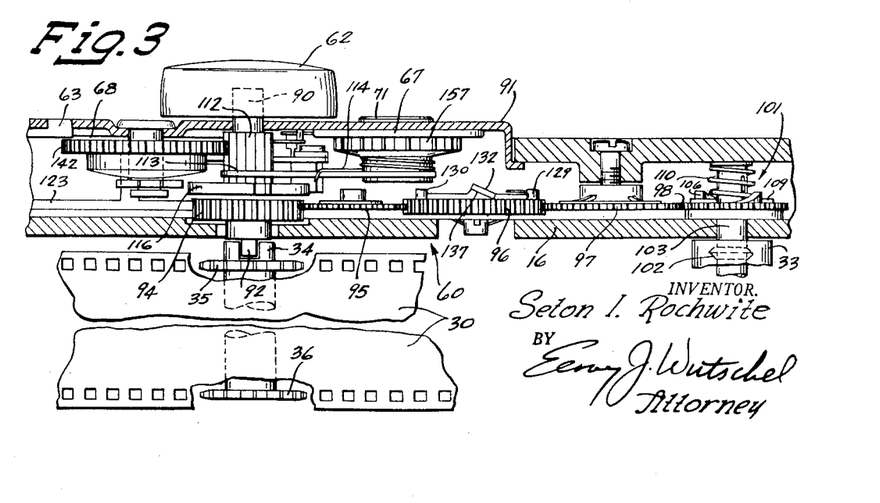
Fig. 3 is an enlarged fragmentary view in vertical longitudinal section, taken generally along the lines 3—3 in Fig. 1 and showing the operative connection between the film advance knob and the internal film feeding mechanism.

In order that three succeeding pairs of stereo transparencies produce a continuous panoramic view, the camera is provided with an improved film transport or feeding mechanism 60, as shown in Figs. 2 and 3. The film feeding mechanism 60 is arranged to so advance the film strip 30 relative to the spaced apart film gates (not shown) associated with the lens mounts 18 and 19 that three successively adjacent stereo pairs can be blended into one stereoscopic panoramic view, providing the entire camera has been appropriately indexed between each succeeding exposure. In addition to advancing the sensitive film strip 30 in properly coordinated relationship, the improved film feeding mechanism 60 is likewise adapted to provide a greatly improved and simplified feeding mechanism for taking conventional single matching stereo pairs.

To actuate the film feeding mechanism 60, there is provided a single rotatable film advance or control knob 62 that is operatively connected to advance the film strip 30 and simultaneously therewith to cock the shutter mechanism (not shown) in preparation for taking the next succeeding picture. After the shutter mechanism has been tripped by actuating the shutter release button 37, the film strip 30 can again be advanced. To permit rotational movement of the control knob 62 to advance the film strip 30, it is necessary to first depress a release lever 63 after which the film advance or control knob 62 is again rotated to advance the film strip into a position for taking another picture and to recock the shutter mechanism. It will thus be apparent that the shutter release button 37, the film release lever 63, and the film advance knob 62 constitute the primary operating controls.

To provide a visual indication of the advancement of the film strip 30 within the camera, as shown in Fig. 1, the film transport control knob 62 is likewise connected to effect a simultaneous, coordinated rotatable indexing movement of an exposure indicator dial 67 and a panoramic sequence indicator dial 68. The exposure indicator dial 67 is provided with indicia adapted to be viewed through an opening 69, and read against a zero mark 70 to indicate the total number of pictures (stereo pairs) that have not yet been exposed. For example, assuming the camera is fully loaded with a film strip capable of receiving twenty exposures of stereo pairs, then the exposure indicator dial 67 would be manually rotated by knob 71 so that the number 20 would appear opposite the zero mark 70. After taking one picture, and rotating the film transport knob 62 to advance the film strip 30 for the next succeeding picture, the number nineteen is read against the zero mark 70. This operation is repeated after tripping the shutter release button 37 to expose each succeeding stereo pair, with the number appearing on the exposure indicator dial 67 always being indexed to indicate the number of unexposed stereo pairs that remain in the camera.

The panoramic sequence indicator dial 68, which is coordinately operable with the exposure indicator dial 67, is calibrated with three letters A, B and C that correspond to the indicia on the panoramic indexing device 42, Fig. 7. Thus, for taking a series of three stereo pairs to obtain a panoramic view, it is necessary that the panoramic indicator dial 68 is so positioned that the letter A appears through an indicator window opening 73 provided in the top wall of the camera, and can be read against a zero mark 74. Thus, with the tripod 43, Fig. 7, properly positioned; the camera indexed to the A position and a corresponding letter A appearing on the panoramic indicator dial 68, Fig. 1; the first or A stereo pair is exposed by depressing the shutter release button 37. The camera is then rotated to the second or B position, and the release lever 63 depressed to permit rotating the film transport knob 62. As hereinbefore explained, rotating the film transport knob 62 simultaneously operates to advance the film strip 30; to cock the shutter mechanism for taking the next picture; and to rotate both the exposure indicator dial 67 and the panoramic sequence indicator dial 68, the latter now being in the B position corresponding to the B indexed position of the camera. The shutter release button 37 is again actuated to expose the B pair of stereo pictures of the panoramic series. This entire operation is then repeated to take the C pair of stereo exposures to complete a sequence of three adjacent stereo exposures, which, when developed, can be viewed as a single stereoscopic panoramic view.

Figure 6:
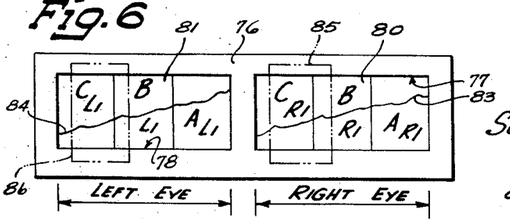
Fig. 6 is a slide mount adapted to carry one panoramic sequence of stereo pairs.

The novelty of the invention resides principally in the novel actuating and control mechanism, as well as in the application of the panoramic principle to a stereo camera, and the improved method of mounting a plurality of stereo views. Although the film advancing mechanism provides greatly improved results in the taking of conventional stereo pairs, the actuating mechanism is particularly adapted to control the advancement of a film strip so that a succession of adjacent stereo pairs produce the panoramic effect. In the particular embodiment of the invention shown, three adjacent stereo pairs are adapted to be exposed in properly indexed sequence, i.e. bodily indexing movement of the entire camera before exposing each of the three pairs. After being properly exposed and developed, a particular set or continuous sequence of three stereo pairs, constituting a panoramic stereo view, are adapted to be mounted for viewing in an enlarged slide holder 76 as shown in Fig. 6. The slide holder or mount 76 is provided with two spaced apart, elongated rectangular openings 77 and 78 respectively adapted to receive two developed film strips 80 and 81. The single continuous film strip 80 for the right eye comprises three transparencies or frames $A_{R1}$, $B_{R1}$ and $C_{R1}$ of a developed film. In like manner, the corresponding continuous film strip 81 for the left eye comprises three transparencies or frames $A_{L1}$, $B_{L1}$, and $C_{L1}$. Thus the two transparencies or frames $A_{R1}$ and $A_{L1}$ constitute one matched stereo pair; $B_{R1}$ and $B_{L1}$ constitute the second stereo pair; and, $C_{R1}$ and $C_{L1}$ constitute the third stereo pair.

It is to be emphasized that each of the film strips 80 and 81 are developed and cut as single continuous transparencies. Although lines of demarcation are shown in Fig. 6 to indicate the successive adjacent frames respectively comprising the strips 80 and 81, there is no actual physical separation between the respective frames. In prior types of stereo cameras, on the other hand because of the mixed sequence of successive pairs, it would be necessary to cut each of the frames, for example $A_{R1}$ and $A_{L1}$, separately. Since the indexing sequence and entire mode of operation of prior stereo cameras is completely different, it would likewise be necessary, in a similar manner, to cut separately each of the other frames that might be intended to constitute a panoramic stereoscopic view. It will be readily apparent that such a sequence of separate, individually cut stereo frames would entail considerable expense in mounting. Likewise, after mounting, and, irrespective of the care exercised in mounting, the lines of separation between the adjacent pairs would be extremely noticeable to a person viewing the panoramic sequence. In order to mount such separately cut stereo frames for panoramic viewing, some kind of masking arrangement would probably be required between the frames.

With the continuous transparencies 80 and 81, Fig. 6, made possible by the present invention, on the other hand the lines of demarcation between the adjacent frames are virtually imperceptible. As a consequence, the transparencies 80 and 81 can be viewed at any spaced apart portions along their lengths to obtain a stereo effect. To better illustrate the panoramic continuity and precision of matching between the adjacent stereo pairs, two imaginary "horizon lines" 83 and 84 are illustrated in the transparencies 80 and 81 in Fig. 6.

In order to view the panoramic stereo views 80 and 81, the spaced apart eyepieces of a suitable stereo viewer, such as the eyepieces 85 and 86 shown in phantom, are applied in a selected position along the respective views. In Fig. 6, the eyepiece 85 for the right eye is shown in overlapping relationship to the adjacent frames $B_{R1}$ and $C_{R1}$. In a similar manner, the eyepiece 86 for the left eye is shown in overlapping relationship relative to the adjacent frames $B_{L1}$ and $C_{L1}$. A person looking through the spaced apart eyepieces 85 and 86 then sees spaced, corresponding portions of adjacent frames that blend together to produce one matching stereo pair, with the pair merging in the mind of the viewer to constitute one image. By moving the enlarged slide mount 76 relative to the spaced apart eyepieces 85 and 86, from right to left or vice versa, it is possible to obtain a third dimensional effect of the complete panoramic sequence.

In addition to the panoramic effect per se, it is evident that two continuous strips, such as the strips 80 and 81, shown in Fig. 6, are extremely advantageous in simplifying both mounting and viewing procedures. Assume now, for further illustrative purposes, that the respective matching pairs comprising the continuous strips 80 and 81 are each separate single stereo views, and not a panoramic sequence. The strips 80 and 81 can still be developed, cut and mounted in the elongated slide holder 76, shown in Fig. 6. While such strips would not represent a panoramic sequence, the single elongated slide holder would greatly simplify the viewing of three, adjacent stereo pairs. Likewise, a single enlarged slide holder for a plurality of stereo pairs would greatly simplify both the handling and storage problem. In other words, the single elongated slide holder, with three adjacent stereo pairs, would replace three conventional single slide mounts, each carrying one matching stereo pair in well known manner.

Figure 5:
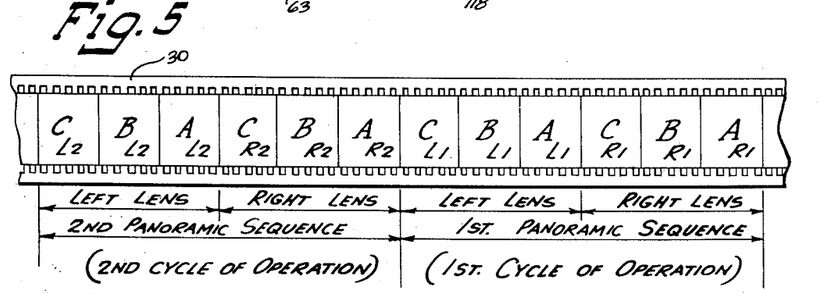
Fig. 5 is a fragmentary view of a portion of a sensitized film strip illustrating the cyclical pattern of advancement of three successively adjacent stereo pairs.

For comparative purposes, corresponding frames of the continuous panoramic transparencies 80 and 81, Fig. 6, are identified in a manner identical to the successively adjacent frames on the film strip 30 in Fig. 5. As there shown, the first panoramic sequence comprises three successively adjacent matching stereo pairs. The right lens 20, carried by the right lens mount 18, is adapted to successively expose the frames $A_{R1}$, $B_{R1}$, and $C_{R1}$; at the same time, the left lens 21, carried by the left lens mount 19, is operative to successively expose frames $A_{L1}$, $B_{L1}$, and $C_{L1}$. At the completion of the first panoramic sequence or cycle of operation, the first six frames, $A_{R1}$ to $C_{L1}$ inclusive, have been exposed. The indexable movement of the film strip 30 is accomplished with such precision as to preclude any unexposed film, and overlapping, between the last frame $C_{R1}$ taken by the right lens 20 and the first frame $A_{L1}$ taken by the left lens 21.

After completing the first cycle of operation, the film strip 30 is caused to be indexably advanced a sufficient distance to position the frames $A_{R2}$ and $A_{L2}$ properly relative to the lenses carried by the lens mounts 18 and 19 respectively. The film strip 30 is then again caused to be successively and indexably advanced by smaller increments during the second panoramic sequence constituting the second cycle of operation. These cycles of operation are repeated in a similar manner until all of the film has been exposed.

Inasmuch as the panoramic principle has not heretofore been applied to stereo cameras, the foregoing description is deemed essential to a full description of the operation of the improved film feeding mechanism 60 in effecting the improved indexable advancement of the film strip. Referring again to Figs. 1, 2 and 3, the film advance knob 62 is secured to the outer end of a control shaft 90 that is rotatably journalled in the wall of a bracket housing 91 removably secured to the upper face of the camera housing 16. The bracket housing 91 provides a removable unitary mount for one portion of the film transport or feeding mechanism disposed to meshingly engage an associated portion of the mechanism carried by the camera housing 16 whenever the bracket housing 91 is secured thereto as shown in Fig. 3. This unitary type construction greatly simplifies initial assembly of the operating mechanism, and, likewise facilitates inspection or repair, removal of the bracket housing 91 providing immediate access to the cooperating components respectively carried by the main housing 16 and the bracket housing 91.

At its extreme inner end, the central control shaft 90 is provided with a rectangular driving lug 92 disposed to meshingly engage the forked outer end of the sprocket shaft 34 journalled in the frame 16. In order that the take-up spool 33 rotates whenever the control knob 62 is turned to rotate the sprocket shaft 34, a drive gear 94 secured to the control shaft 90 is disposed to effect rotation of an operatively intermeshing gear train comprising gears 95, 96, 97 and 98 journalled in the upper face of the hollow main housing 16. The gear 98 is connected to effect a corresponding counterclockwise rotation of the take-up spool 33, the driving connection being effected by means of an over running clutch mechanism 101 and a friction clutch mechanism 102 contained within the take-up spool 33, and connected to be driven by an axle 103. The intermeshing gears 95, 96, 97 and 98 are so arranged that the spool 33 is caused to rotate in a counterclockwise direction at a slightly faster rate than the sprocket shaft 34 with the over running clutch mechanism 101 being maintained in positive driving engagement and the friction clutch mechanism 102 permitting a slight frictional slippage between the axle 103, driven by the gear 98, and the spool 33.

It will be apparent that in using the camera, more and more of the 35 mm. film strip is taken up on the spool 33 as successive exposures are taken. It will be equally apparent that as more film is received on the spool 33, fewer turns of the spool will be required to effect the same lineal advancement of the film strip 30 through the camera. The frictional clutch mechanism 102, therefore, permits sufficient slippage to automatically adjust the rotational speed of the take-up spool 33 relative to the sprocket shaft 34 and maintains tension on the film strip extending therebetween. The drive gear 98 is freely journalled for rotation on the outer end of the axle 103 and is provided with a pair of angular cam surfaces 104 and 105 respectively terminating in flat driving faces 106 and 107. Whenever the gear 98 is rotated in a counter-clockwise direction, the flat driving faces 106 and 107 are urged into driving engagement with a transverse pin or pawl 109 slidably carried in a slot formed in the outer end of the rotatable axle 103 for the spool 33 for bodily movement longitudinally of the axle. A spring 110 is adapted to urge the pin 109 inwardly in a manner that the opposite ends thereof are engaged by the driving faces 106 and 107 whenever the gear 98 is rotated in a counter-clockwise direction. This arrangement permits manual rotation of the spool 33 in a counterclockwise direction to overrun the drive gear 98 whenever the drive gear is not being rotated. This is advantageous in initially loading the camera, as well as in rewinding the film strip into the cartridge.

Thus, rotational movement of the knob 62, in a counterclockwise direction, effects a corresponding counterclockwise rotation of the sprocket shaft 34 and take-up spool 33 to properly position successive spaced apart portions of the film strip 30 relative to the spaced apart lenses 20 and 21 respectively carried by the lens mounts 18 and 19. To prevent rotation of the knob 62 in any direction but a counterclockwise direction during indexable feeding advancement of the film, a gear 112 secured to the shaft 90 is disposed to be engaged by the end of a pivotable ratchet arm 113. A spring 114 is connected to normally urge one end of the arm 113 into engagement with the gear 112.

Figure 4:
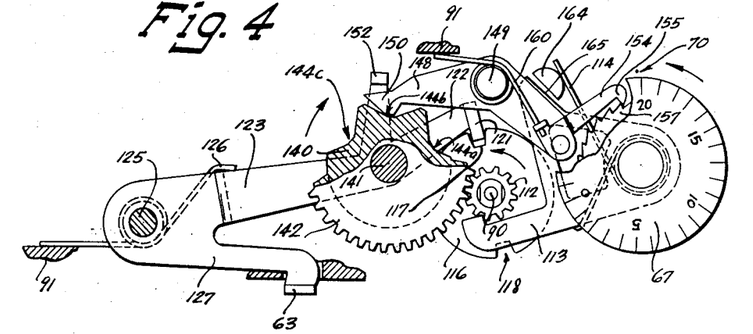
Fig. 4 is an enlarged fragmentary detailed view of a portion of the film indexing mechanism.

To limit the rotational advancement of the knob 62 for properly positioning successive spaced apart portions of the film strip 30 relative to the twin lens mounts 18 and 19, as shown in Figs. 2, 3 and 4, a circular index plate 116 is secured to the central control shaft 90. The index plate 116 is provided with two equally spaced apart, radially disposed indexing notches 117 and 118. To lock the film transport or feeding mechanism 60 in fixed position at the completion of each rotational, indexed advancement of the knob 62, one or another of the radial notches 117 and 118 presented by the index plate 116 is disposed to be engaged by a movable indexing member 121.

As shown in Figs. 2 and 4, the indexing member 121 is fixedly secured to the extreme outer end of an arm 122 integrally formed with an indexing lever 123 that is carried for sufficient pivotal movement to permit selective withdrawal of the indexing member or pin 121 from engagement with the indexing plate 116. To effect this result, the outer end of the indexing lever 123 is rotatably carried by a shaft 125 secured to the inner face of the bracket housing 91. The indexing lever 123 is resiliently biased by a spring 126 in a manner that the indexing member 121 secured thereto is normally urged into engagement with one or another of the radial notches presented by the circular indexing plate 116. For selectively withdrawing the member 121 from indexing engagement with the circular plate 116, the indexing lever 123 is provided with another angularly diverging arm 127 that has integrally secured to its extreme outer end the release lever 63. A portion of the arm 127 is disposed to project through an opening formed in the housing bracket 91 in a manner that the release lever 63 is externally accessible as one of the primary operating control levers. Thus momentarily depressing the release lever 63 (as viewed in Fig. 4A) effects an upward pivotal movement of the indexing lever 123 with a concomitant withdrawal of the indexing member 121 from engagement with the radial notch 117 in the circular plate 116. The knob 62 is then turned to rotate the sprocket shaft 34 and take-up spool 33 to advance the film strip 30 to the "C" position. Since the release lever 63 is depressed only momentarily, rotational movement of the transport knob 62 continues until the indexing member 121 is urged into engagement with the next radial notch, in this case the notch 118.

As soon as the indexing member 121 is urged into engagement with the radial notch 118, the film strip 30 is properly positioned for receiving the C exposure, which constitutes the third pair of a series of three stereo pairs comprising a panoramic sequence. The shutter release button 37 is then depressed to expose the "C" pair, since the shutter mechanism (not shown) is automatically cocked each time the knob 62 is rotated to advance the film strip 30. For cocking the shutter mechanism (not shown), a pair of pins 129 and 130 Figs. 2 and 3, secured in diametrically opposed relationship to the outer face of the gear 96 are disposed to coact with a downwardly depending arm 132 secured to an actuating member 133 slidably carried within the hollow housing 16. The actuating member 133 is normally urged rightwardly by means of a spring 134 connected at one end to the slidable member 133 and at the opposite end to an inner wall at the housing 16. Movement of the actuating member 133 to its extreme leftward position is operatively connected to cock the shutter mechanism (not shown) in well known manner.

To effect leftward cocking movement of the actuating member 133, the gear 96 is connected to be rotated 180° in a counterclockwise direction each time the knob 62 is rotated counterclockwise to advance the film strip 30. Counterclockwise rotation of the gear 96 causes movement of one or another of the pins 129 and 130 into engagement with the rightward edge of the depending arm 132 to urge the actuating member 133 to its extreme leftward position. Each time one or another of the pins 129 and 130 is rotated a full 180° in a counterclockwise direction, the member 133 is urged leftwardly into engagement with an independently movable arm 136 to fully cock the shutter mechanism (not shown). The arm 136 is then retained in its leftward position until the shutter release button 37 is depressed to trip the shutter mechanism (not shown) for taking a stereo picture simultaneously exposing two, spaced apart portions of the film 30.

Although the cocking pins 129 and 130 operate to automatically cock the shutter mechanism (not shown), it is sometimes advantageous to cock the shutter without advancing the film strip. This may happen, for example, in the event of flash bulb failure or for obtaining deliberate double exposures. In the event circumstances require, the arm 136 can be moved leftwardly to cock the shutter mechanism (not shown) independently of the film advance knob 62 and actuating member 133.

To permit rotation of the gear 96 in a clockwise direction, when the film strip is being rewound into the cartridge, the depending arm 132 is formed to present an angular inner face 137. Whenever the gar 96 is rotated in a clockwise direction, the pins 129 and 130 successively engage the angular face 137 of the depending arm 132 to pivot the arm laterally out of engagement with with the pins and thus preclude any locking or binding action with the gear 96.

In taking a panoramic sequence of three successive stero exposures, the indexing member 121 is disposed to engage the radial notch 118 of the indexing plate 116 when the shutter release button 37 is depressed to take the "A" pair, for example the pair $A_{R1}$ and $A_{L1}$ in Fig. 5.

Having indexed the camera and advanced the film strip 30, the indexing member 121 is then in engagement with the radial notch 117 of the index plate 116, as shown in Fig. 4, for the "B" pair corresponding to the pair $B_{R1}$ and $B_{L1}$. In a similar manner, the indexing member 121 is disposed to reengage the notch 118 for taking the "C" pair, indicated in Fig. 5 by $C_{R1}$ and $C_{L1}$. It will be apparent that during this one sequence or cycle of operation, the film strip 30 has been advanced by equal increments to respectively position spaced apart portions of the film strip as determined by the equal spacing between the notches presented by the index plate 116. At this time, however, after completing one sequence, it is necessary to advance the film strip a sufficient distance that the frames $A_{L1}$, $B_{L1}$ and $C_{L1}$ completely clear the right lens mount 18. In other words, the film strip must be advanced sufficiently so the frames $A_{R2}$ and $A_{L2}$ are respectively positioned rearwardly of the right lens mount and the left lens mount.

To accomplish this, there is provided a cycle control means comprised of a rotatable timing cam 140 that is operatively connected to be rotated in synchronism with the control shaft 90. The cam 140 is secured to a shaft 141 that is rotatably journalled in the bracket housing 91 and has affixed thereto a concentric driver gear 142 having meshing engagement with the pinion 112 secured to the control shaft 90. Rotation of the knob 62 in a counterclockwise direction thus effects rotation of the driven gear 142 and timing cam 140 in a clockwise direction. The timing cam 140 is provided with three peripheral indentations designated 144A, 144B and 144C corresponding generally to the designations A, B and C respectively presented by the panoramic sequence indicator dial 68. A relatively small lobe of the cam 140 separates the indentations 144A and 144B. A similar small lobe of the cam separates the indentations 144B and 144C. Between the indentations 144C and 144A, on the other hand, there is formed on the timing cam 140 an enlarged peripheral lobe. A rocker arm 148 pivotally mounted on a shaft 149 secured to the bracket housing 91 is resiliently biased in a manner that the forward end 150 thereof is continuously urged into engagement with the peripheral edge of the cam 140.

During rotational movement of the timing cam 140, the forward end 150 of the resiliently biased rocker arm 148 operates as a cam follower. The irregular peripheral contour of the cam 140 effects a corresponding inward or outward movement of the forward end 150 of the rocker arm. Whenever the follower end 150 engages one of the indentations 144A, 144B, or 144C of the cam 140, the indexing member 121 is in engagement with one of the radial notches 117 and 118 presented by the index plate 116. Whenever the follower end 150 engages one of the two smaller lobes or the larger lobe separating the three adjacent indentations of the cam 140, the rocker arm 148 is moved outwardly. The rearward edge of the follower end 150 is then urged into engagement with a lateral extension 152 carried by an angular arm integrally formed with the pivotably movable index lever 123. Outward movement of the rocker arm 148 therefore effects a like upper movement of the indexing lever 123 to prevent engagement of the indexing member 121 with one of the notches presented by the index plate 116.

By means of this arrangement, the follower end 150 of the arm begins to engage the enlarged lobe of the cam 140 at the completion of each panoramic sequence or cycle of operation. With the follower end 150 of the rocker arm moved into engagement with the enlarged lobe of the cam 140, when the cam is rotated, the indexing member 121 is retained in disengaged position relative to the indexing plate 116 for two complete revolutions of the knob 62 and the indexing plate 116. During this interval, occurring between each repetitive cycle of operation, the film strip 30 is therefore caused to be advanced by a much greater amount. As a result, the three frames $A_{L1}$, $B_{L1}$ and $C_{L1}$ (exposed during the first cycle of operation) are lineally advanced beyond the film gate for the right lens 20 carried by the lens mount 18. The follower 150 then moves inwardly from the enlarged lobe of the cam 140 to reengage the indentation 144A, and the indexing member 121 reengages the radial notch 118 of the index plate 116. Simultaneously the frames $A_{R2}$ and $A_{L2}$ are moved into proper position relative to the film gates to start the next panoramic sequence. For indicating the start of another panoramic sequence, the indicator dial 68 which is secured to the gear 142 is rotated to position the letter "A" in the opening 73.

For effecting a simultaneous rotatable movement of the exposure indicator, dial 67, Fig. 1, a movable ratchet arm 154 is pivotably secured to the opposite or rearward end of the rocker arm 148 as shown in Figs. 2 and 4. A single ratchet tooth 155 formed on the outer end of the ratchet arm 154 is resiliently biased into engagement with a ratchet wheel 157 that is connected to effect rotational advancement of the exposure indicator dial 67 in a counter-clockwise direction. For setting the exposure indicator dial 67 to zero whenever a new roll of film is inserted in the camera, there is provided the knob 71, Fig. 1, that is operative to rotate the dial 67 in a counter-clockwise direction. Rotating the knob 71 in a counterclockwise direction effects a corresponding rotation of the ratchet wheel 157, the ratchet teeth of which are formed to then over run the ratchet arm tooth 155, for positioning the proper number of exposures, for example 20, on a new roll of film. To urge the single tooth 155 of the ratchet arm 154 into engagement with the ratchet wheel 157, a spring 160 secured to the hub of this arm is fixedly secured at its outer end within the bracket housing 91. Since the ratchet arm 155 is pivotably secured to one end of the rocker arm 148, the spring 160 is likewise operative to urge the opposite follower end 150 of the rocker arm 148 into engagement with the peripheral timing cam 140.

In operation, outward movement of the follower end 150 of the arm 148 effects a corresponding downward movement of the ratchet arm 155 to rotate the ratchet wheel 157 for effecting the required indexable movement of the exposure indicator dial 67.

Figure 4A:
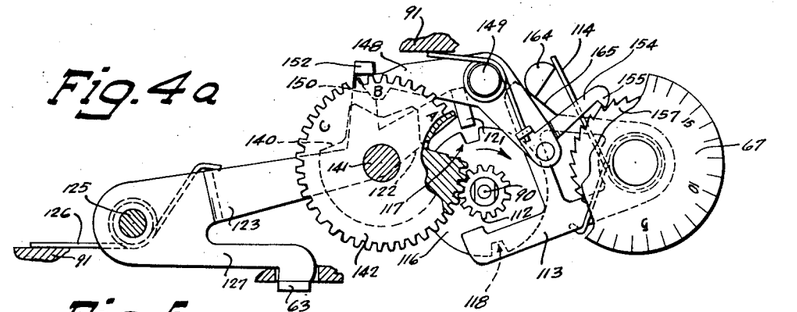
Fig. 4A is an enlarged fragmentary view showing the indexing mechanism in the film rewinding position.

After a roll of film has been completely exposed, it is necessary to rewind the film into the light proof cartridge (not shown) associated with the rewind knob 31. Before rotating the rewind knob 31 in a clockwise direction to rewind the film, it is necessary to turn a release lever 162, Figs. 1 and 2, secured to a shaft journalled in the bracket housing 91 to permit reversed rotation of the control knob 62 and feed mechanism 60. At its inner end, the release lever shaft is provided with a cam 164 having a flat surface positioned adjacent to the upper edge of the rearward end of the rocker arm 148 and an angularly diverging arm 165 integrally formed with the ratchet arm 113, as shown in Fig. 4. Thus pivotal movement of the release lever 162 to its upper position effects a corresponding pivotal movement of the cam 164, as shown in Fig. 4A, which in turn, effects a simultaneous pivotal movement of the rocker arm 148 and ratchet arm 113. As the rearward end of the rocker arm 148 is pivoted downwardly, the forward end 150 thereof is moved upwardly to engage the transverse extension 152 secured to the indexing lever 123. Upward movement of the lever 123 in turn effects movement of the indexing member 121 to disengaged position relative to the index plate 116. At the same time, downward movement of the angular arm 165 effects a corresponding downward movement of the ratchet arm 113 out of engagement with the pinion 112.

With the indexing member 121 and the ratchet arm 113 being respectively retained in disengaged position, as clearly shown in Fig. 4A, the control shaft 90 secured to the index plate 116 and pinion 112 is freely rotatable in a clockwise direction. Likewise, the sprocket shaft 34 rotates freely to permit clockwise rotation of the rewind knob 31 for rewinding the film into the cartridge associated therewith.

From the foregoing description and explanation of the stereo camera herein set forth as exemplifying the invention, it is apparent that there has been provided an improved film feeding mechanism and panoramic apparatus for a stereo camera. The film feeding mechanism is especially adapted to effect a sequential indexable advancement of a plurality of successively adjacent frames of a film strip relative to the spaced apart lenses of a stereo camera. To accomplish this, an improved indexing and timing mechanism is connected for coordinate synchronized operation with the film feeding mechanism. Although the successively adjacent pairs are particularly adaptable for taking panoramic stereo views, the method of producing continuous strips in stereoscopic correspondence produces greatly improved results in mounting both conventional and panoramic views for stereo viewing.

The illustrative embodiments of the invention have been described in some detail for the purpose of setting forth practical exemplifying apparatus. It is to be understood, however, that the particular structures herein described are intended to be illustrative only. For example, the spacing between the spaced apart lenses of a stereo camera is approximately the same as the spacing between human eyes for obvious reasons. In order to achieve maximum size in each stereo pair therefore, the particular mechanism described as exemplifying the invention provides the sequential advancement of three adjacent stereo pairs.

Within the limitation imposed by the spacing between the lenses, it is obvious that a greater or lesser number of adjacent stereo pairs may be adapted to be indexably advanced by varying the size of the individual picture comprising each stereo pair. The various inventive features adapted to accomplish the greatly improved results therefore may be incorporated in other structural forms without departing from the spirit and scope of the invention as defined in the subjoined claims.

The principles of the invention having now been fully explained in connection with the foregoing description of embodying structure, I hereby claim as my invention:

1. In a stereo camera having spaced apart lenses and being particularly arranged for taking a panoramic sequence of stereo views, feeding mechanism connected to advance a film strip relative to said spaced apart lenses, cyclically operable indexing mechanism for selectively controlling said feeding mechanism to sequentially position a plurality of successively adjacent frames of spaced apart portions of a film strip relative to each of said lenses respectively during each cycle of feeding operation, cycle control means including a timing cam operatively connected to render said indexing mechanism inoperative for a predetermined timed interval after each cycle of operation to permit continuous operation of said feeding mechanism, said cycle control means being connected to render said indexing mechanism operative for indexably controlling the operation of said feeding mechanism to start another cycle of operation, and a single control device operatively connected to effect a coordinate operation of said feeding mechanism, said indexing mechanism and said cycle control means.

2. In a stereo camera having a pair of spaced apart lenses, a film feeding mechanism operatively connected to effect feeding advancement of a film strip relative to said spaced apart lenses, an indexing mechanism connected to positively stop said feeding mechanism after each successive uniform indexable advancement of a film strip relative to said lenses, release means cooperating with said indexing mechanism to permit a continued movement of said feeding mechanism, said indexing mechanism being operative to automatically control said film feeding mechanism for effecting a uniform incremental advancement of a film strip to a plurality of indexed positions constituting one cycle of operation, a timing mechanism operatively connected to preclude operation of said indexing mechanism to permit continuous operation of said feeding mechanism during a predetermined timed interval, and a single control knob connected to effect a coordinate actuation of said mechanisms.

3. In an indexing mechanism for a camera, a frame, a rotatable shaft journalled in said frame, an index plate carried by said shaft for rotation therewith, said index plate presenting a plurality of indexing notches, an indexing member engageable with one or another of the indexing notches presented by said plate, resilient means connected to urge said member into engagement with one or another of the notches presented by said plate, a release lever operatively connected to disengage said indexing member from engagement with said index plate in order that said plate may be rotated to its next indexed position, a timing mechanism including a cam connected to be driven by said shaft, a rocker arm connected to be driven by said cam, said rocker arm being operatively connected to retain said index member in disengaged position relative to said index plate to permit continuous rotation of said shaft for a predetermined timed interval, and a single control device connected to effect coordinated operation of said shaft, said index plate and said timing mechanism.

4. In a stereoscopic camera having a pair of spaced apart lenses, a combined film feeding and indexing mechanism operatively connected to advance a film strip relative to said lenses, said mechanism being so operative as to advance a plurality of successively spaced apart portions of a film strip to a series of indexably spaced positions relative to said lenses during one cycle of operation, the arrangement being such that during each cycle of operation a plurality of successive exposures taken by one of said lenses are positioned adjacent each other on one continuous portion of a film strip in stereoscopic registration with a like number of successive exposures taken by the other of said lenses and that are likewise positioned adjacent each other on another continuous portion of the film strip, a timing mechanism operatively connected to modify the operation of said combined indexing and feeding mechanism, a single control device connected to effect a coordinated actuation of said mechanisms for advancing a film strip relative to said lenses during repetitive cycles of operation, and a sequence indicator connected to be indexably actuated by said control device, said sequence indicator being provided with indicia for indicating the sequence of the successive indexable positions of a film strip during each cycle of operation.

5. In a stereoscopic camera having a pair of spaced apart lenses, cyclically operable film feeding mechanism connected to effect selective indexable feeding advancement of a pair of spaced apart portions of a film strip relative to said lenses, the arrangement being such that successively adjacent frames of the spaced apart portions of the film are successively positioned relative to said lenses during each cycle of operation, a timing mechanism connected to control the operation of said film feeding mechanism for repeating the cycles of operation thereof after a predetermined timed interval in a manner that spaced apart portions of a film strip as well as the successively adjacent frames respectively comprising each portion of the film strip are in continuous stereoscopic correspondence, a sequence indicator connected to be actuated by said timing mechanism and operative to indicate the sequence of the indexable positioning movement of a film strip during each cycle of operation, and a control knob connected to effect coordinated operation of said film transport feeding mechanism and said timing mechanism.

6. In a stereoscopic camera having a pair of spaced apart lenses and being arranged for taking a panoramic sequence of stereo views, a panoramic sequence indicator calibrated with indicia for indicating the particular number of one pair of a sequence of successively adjacent stereo pairs that are to be sequentially exposed to constitute a continuous panoramic sequence, an exposure indicator calibrated to indicate the total number of unexposed stereo pairs that remain on a sensitized film strip in said camera, a film feeding mechanism connected to effect indexable feeding advancement of a film strip relative to said lenses, associated actuating mechanism operatively connected to effect coordinate feeding movement of said mechanism and both of said indicators, an indexing device operatively arranged to indexably position said camera in a selected one of a plurality of spaced positions for taking panoramic views, and indicia associated with said indexing device corresponding to the indicia associated with said panoramic sequence indicator.

7. In a film feeding mechanism for a camera, a frame, a film engaging sprocket shaft journalled in said frame, a gear train journalled in said frame connected to be driven by said sprocket shaft, a film receiving take-up spool journalled in said frame connected to be driven by said gear train, a friction clutch operatively interconnected between said gear train and said take-up spool, a hollow housing bracket removably secured to said frame, a control knob journalled in said bracket connectable to drive said shaft whenever said housing bracket is secured to said frame, an indexing mechanism carried in said bracket housing connected to predeterminately limit rotational movement of said control knob, a release lever movably carried by said bracket connected to selectively release said indexing mechanism to permit continued rotational movement of said control knob, and a timing device carried by said housing connected to be actuated by said control knob, said timing device being operatively connected to retain said indexing mechanism in inactive position for effecting continued rotational movement of said control knob at regularly recurring intervals.

8. In a stereo camera having a pair of spaced apart lenses and being adapted to take a plurality of successively adjacent exposures on spaced apart continuous portions of a film strip during each cycle of a plurality of cycles of operation, feeding mechanism connected to advance a film strip relative to said lenses, indexing means connected to control said feeding mechanism in a manner to effect uniform indexable feeding movement of the film during each cycle of operation, cycle control means operative to the regularly interrupt the operation of said indexing means to effect continuous feeding movement of the film at the conclusion of each cycle of operation, a sequence indicator operative to indicate the sequential number of the successive exposures taken during each cycle of operation, an indexing device operatively arranged to effect bodily indexable movement of said camera to a selected one of a plurality of indexed positions, and indicia associated with said indexing device adapted to register the indexed position of said camera whereby the positioning movement of said film as indicated by said sequence indicator can be coordinated with the indexable positioning movement of said camera.

9. In a stereo camera arranged for taking a panoramic sequence of stereo views, a camera housing, a panoramic indexing device mounted on said housing, a tripod disposed for attachment to said indexing device and positioned to support said camera for selective positioning, an indexing notch plate with notches within said indexing device operable to selectively control the positioning of said camera in spaced-apart picture-taking positions, a pair of spaced-apart stereo lenses in said picture housing, a film feeding mechanism within said housing operable to advance film for exposure through said spaced-apart lenses, a panoramic sequence indicator calibrated with indicia for indicating the particular number of one pair of a sequence of successive pairs in the process of being successively exposed to constitute a panoramic sequence, with said sequence indicator indicia correspondingly mated to that contained on the panoramic indexing means, said film feeding mechanism operating to advance the sensitized film strip relative to said spaced-apart lenses in operable coordination with said sequence indicator whereby a series of panoramic stereo pairs of pictures are exposed with the edge portions of the respective "pictures" blending in with each other to provide the appearance of a continuous panoramic scene.

References Cited in the file of this patent

UNITED STATES PATENTS

| | | |
|---|---|---|
| 586,097 | Jeffery | July 13, 1897 |
| 728,584 | Dickson | May 19, 1903 |
| 1,751,774 | Trullinger | Mar. 25, 1930 |
| 2,090,017 | Young | Aug. 17, 1937 |
| 2,385,183 | Avers | Sept. 18, 1945 |
| 2,476,576 | Bachelder | July 19, 1949 |
| 2,515,272 | Smith | July 18, 1950 |
| 2,753,775 | Smith | July 10, 1956 |